Sept. 27, 1966  E. J. HERBENAR ETAL  3,275,338
IDLER ARM BRACKET AND SOCKET ASSEMBLY Filed Jan. 10, 1963  2 Sheets-Sheet 1

INVENTORS
Edward J. Herbenar
Alvin W. Alexandrowicz
BY
ATTORNEYS

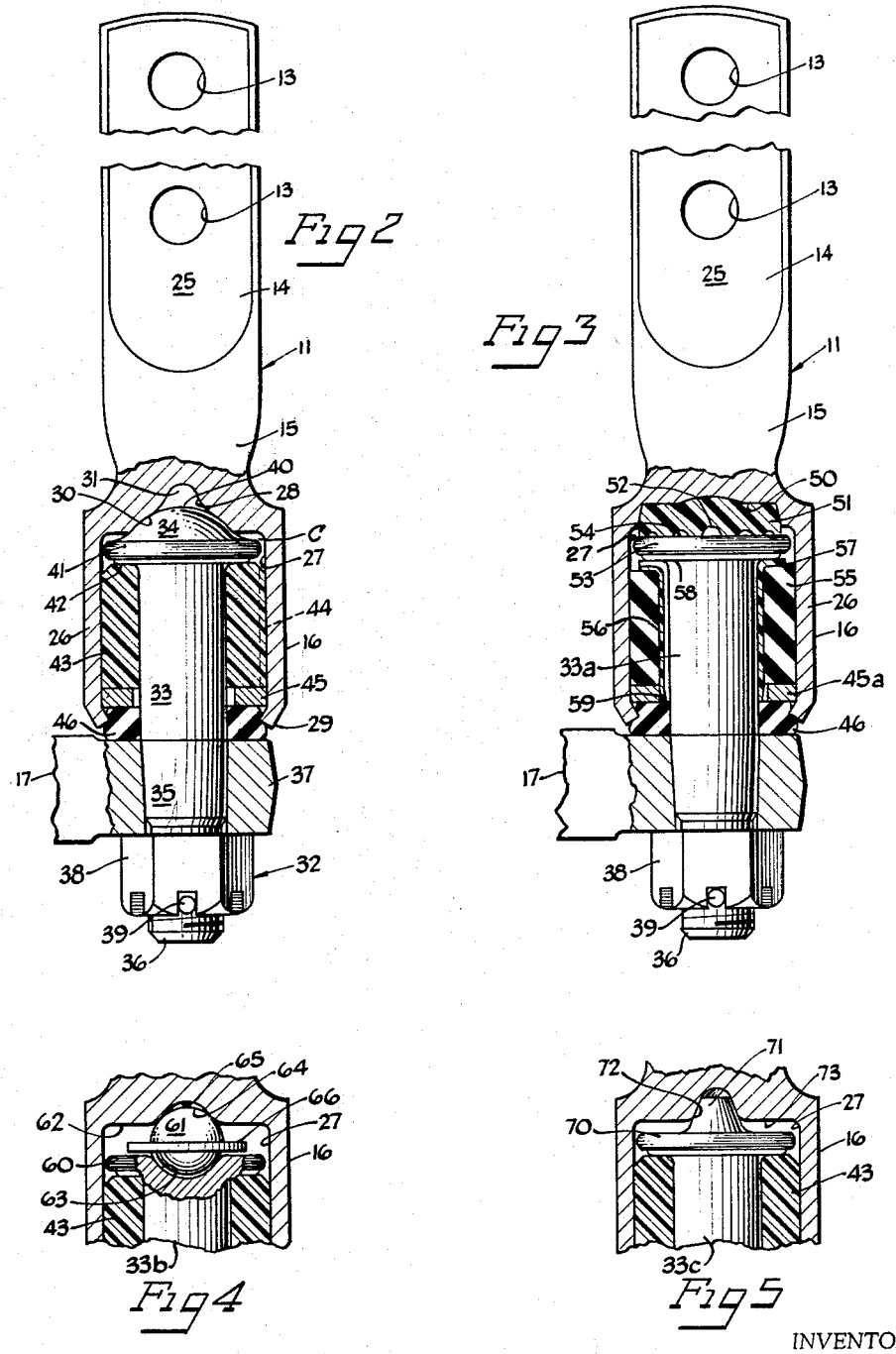

United States Patent Office 3,275,338
Patented Sept. 27, 1966

3,275,338
IDLER ARM BRACKET AND SOCKET
ASSEMBLY
Edward J. Herbenar, Detroit, and Alvin W. Alexandrowicz, St. Clair Shores, Mich., assignors to TRW Inc., a corporation of Ohio
Filed Jan. 10, 1963, Ser. No. 250,607
17 Claims. (Cl. 280—95)

This invention relates to an idler arm bracket and socket assembly for particular use in an automotive steerage linkage. In general, however, the pivot pin joint assembly of the present invention can be used in any linkage system requiring stability and a controlled value of turning torque to effect relative rotation that will remain nearly constant within a predetermined range throughout the useful life of the assembly.

In accordance with the present invention, the idler arm bracket and socket assembly preferably consists of an integral bracket portion at one end and a socket portion at the other end, since by making the arm integral a more compact assembly is provided that permits greater latitude in vehicle design, particularly where ground clearance is a problem. The bracket portion of the idler arm assembly is for attachment to a main supporting frame, such as the chassis of an automotive vehicle, and for this purpose is preferably flattened and provided with apertures for the reception of retaining means. The socket portion of the idler arm assembly is offset from the bracket portion for ease of close mounting on the supporting frame and is adapted for the reception of a pivot pin sub-assembly having an extended end for connection through an attaching link with a center, or crosslink, which, as is customary, forms a part of the steerage linkage system of automotive vehicles.

The pivot pin sub-assembly is of a novel and improved construction that provides the necessary stability for the steering linkage system and at the same time makes it possible to establish a desired value of turning torque that will remain nearly the same throughout the life of the assembly and that requires no periodic lubrication but, instead, constitutes a sealed, self-lubricating joint.

It is therefore an important object of this invention to provide an idler arm bracket and socket assembly of relatively inexpensive and improved construction possessing the novel and useful functions above set forth.

Other and further important objects and features of this invention will become apparent from the following description and from the accompanying drawings, in which like reference numerals refer to like parts, and wherein:

FIGURE 2 is an elevational view, partly broken away and in section, of the idler arm bracket and socket assembly removed from the steering linkage system;

FIGURE 3 is a view similar to FIGURE 2 but illustrating a modification thereof;

FIGURE 4 is a fragmentary, sectional view, partly in elevation and broken away, of a further modification of our invention;

FIGURE 5 is a fragmentary sectional view, partly in elevation, of a still further embodiment of our invention;

As shown on the drawings:

Figure 1:
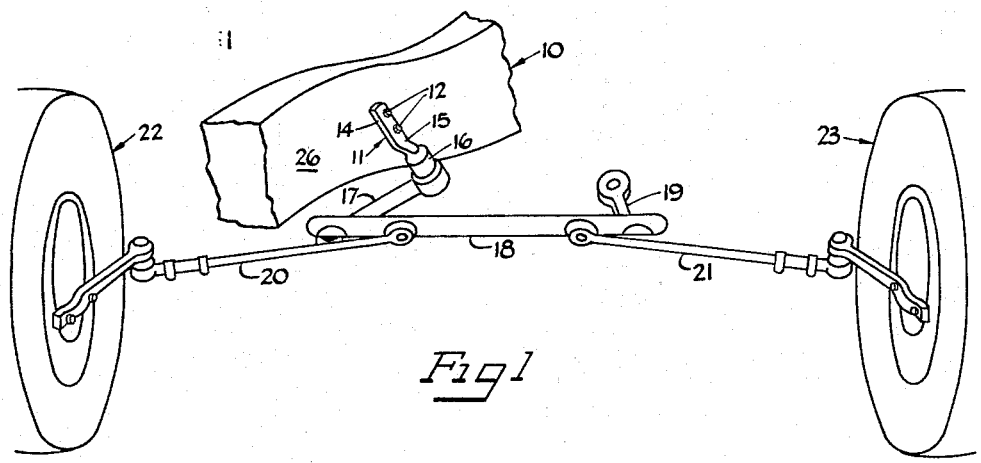
FIGURE 1 is a more-or-less diagrammatic front elevational view, with parts broken away, illustrating the general type of steering linkage system with which the idler arm bracket and socket assembly of our invention can be used to greatest advantage.

As illustrated in FIGURE 1, the reference numeral 10 indicates a portion of the frame, or chassis, to which is attached a steering linkage having as a component part thereof an idler arm bracket and socket assembly 11 embodying the principles of our invention. Said assembly 11 includes an arm, or member 15, having at its upper end a flattened bracket portion 14 and at its other end, formed integrally therewith, a socket portion 16. Said member 15 is attached to the frame 10 by suitable attaching means 12 passing through apertures 13 (FIGS. 2 and 3) provided for the purpose in the bracket portion 14. Due to the offset in said member 15, the socket portion 16 depends clear of the frame 10.

An idler arm 17 connects the lower end 16 of the member 15 to one end of a center link, or cross-link. An attaching link 17 connects the lower end of the bracket and socket assembly 11 to one end of a center link, or crosslink, 18, while a pitman arm 19 is connected to the other end of said center link. Inwardly of the ends of said center link are connected the inner ends of a pair of tie rods 20 and 21 that, in turn, are link connected to the front wheels 22 and 23 of the automotive vehicle. Much of the steering linkage system illustrated in FIGURE 1 is conventional and the showing thereof is merely for illustration purposes and to indicate the environment and field of usefulness of our invention without limiting its application or scope.

With reference more particularly to FIGURE 2, the bracket portion 14 of the idler arm bracket and socket assembly 15 is preferably provided with opposed flattened surfaces 25 for ease of attaching the assembly to a relatively flat surface, such as the surface 26 of the supporting frame 10. The lower socket portion 16 of the assembly 15 is formed with an elongated cylindrical wall 26 which defines with the solid portion of the assembly a coaxial cylindrical socket 27 closed at its inner end, as at 28, and open at its outer end.

The idler arm bracket and socket assembly 15 may be made in various ways, as by cold heading, or upsetting, one end of a bar to form the socket portion 16, and flattening and bending the bar to obtain the desired configuration of the offset bracket portion 14. The socket 27 can be formed internally of a configuration to accept a pivot pin sub-assembly of suitable design within permissible variations depending upon the amount of stability and of tolerance of alignment required, but preferably said socket 27 is fully cylindrical for the major portion of its length and coaxial with the outer cylindrical surface of the socket 16 so that the wall 26 is of relatively uniform thickness throughout. In the embodiment of the invention illustrated in FIGURE 2, the closed end 28 of the socket 16 is formed with a segmental spherical surface 30 terminating inwardly in a relief pocket 31, which may serve as a lubricant or grease pocket. As initially formed, the socket 27 is fully open at its lower or outer end for the reception of a pivot pin sub-assembly, indicated generally by the reference numeral 32, and said end of the wall 26 is swaged or spun during the completion of the assembly to provide the inturned annular retaining flange 29.

Said pivot pin sub-assembly 32 comprises a pivot pin 33 that is fully cylindrical throughout that portion of its length that is positioned within the socket 27, and that is provided with an inner headed end 34 and an outer tapered portion 35 that is integral with a reduced threaded end 36. An apertured end 37 of the idler arm 17 is mounted upon the tapered portion 35 of the pivot pin and held in position thereon by a nut 38 retained on the reduced threaded end 36 of the pivot pin by a cotter pin 39, or other retaining means.

Still with reference to the structure shown in FIGURE 2, the head portion 34 of the pin 33 is provided with a segmental spherical end surface 40 in direct bearing relationship with the surface 30 to absorb the axial thrust, or load, upon the joint. Said head end 34 also has an integral annular portion 41, below the segmental spherical surface 40, that is of larger diameter but provides clearance, as at C, for limited angular, or tilting movement of the pin 33 relative to the socket portion 16. The undersurface of said head portion 34 provides a shoulder 42 for cooperation with the upper end of a bushing 43.

Said bushing 43 is preferably formed of a thermoplastic resin, such as a high density linear polyethylene or polypropylene, or a suitable type of nylon, having a low flex modulus and also good self-lubricating properties. Said bushing 43 is in the form of a cylindrical sleeve of substantial thickness and so dimensioned as to be capable of being slipped over the pivot pin 33 from the lower end thereof prior to inserting the pin and bushing into the socket 27. During such act of insertion, the lower end of the socket wall 26, is, of course, fully open and of the same diameter as the cylindrical wall 26, so that the bushing and pin assembly can be easily inserted. In order to prevent an air or hydraulic lock, a longitudinally extending external groove 44, indicated by dotted lines in FIGURE 2, is provided the full length of the bushing 43. The pin, or stud, 33 may be pre-greased before slipping the bushing 43 thereon, and the bushing-stud assembly is then assembled into the socket cavity, as just described. The fit of the elements of the pivot pin sub-assembly within the bore of the socket 16 does not require any close dimensional control since, as will be shortly explained, the material of the bushing 43 is placed under a compressive load in the final act of assembling.

A ring 45, which may be suitably formed by stamping out of metal sheet, or plate, is slipped over the lower end of the stud 33 against the lower end of the bushing 43 to serve as a retainer therefor and the lower end of the socket wall 27 is swaged or spun over the ring 45 to form the inturned annular flange 29 and thereby complete the assembly. A controlled amount of additional pre-load is provided by compressing the bushing 43 axially during the spinning or cone-swaging operation. A rubber doughnut seal 46 is provided below the ring 45 to prevent entrance of foreign materials and loss of initially supplied lubricant and said seal 46 is also retained in place by the lower inturned annular flange 29. There is thus provided a permanently sealed and lubricated joint.

The structure illustrated in FIGURE 3 represents a modification of that of FIGURE 1 with respect to the stud and its sub-assembly. Where the idler arm bracket and socket assembly are the same as in FIGURE 2, similar reference numerals will be used in FIGURE 3. In this modified form of our invention, the inner or closed end of the bore of the socket 27 is provided with a recess 50 providing a pocket for a seat 51 formed of a synthetic thermoplastic resin, or elastomer such as a polyurethane or a polyethylene resin. Said seat 51 is provided on its lower surface with a plurality of reservoirs 52 for the reception of a lubricant, or grease. Said grease reservoirs 52 serve to maintain a grease film between the seat 51 and the upper headed end 53 of the stud 33a and thereby maintain a low and constant turning torque between the contacting surfaces of said seat and headed end. The stud 33a is otherwise generally similar to the stud 33, but the headed end 53 has a plane upper surface 54 that is held in surface-bearing relationship to the lower face of the seat 51.

Still with reference to the modified structure illustrated in FIGURE 3, a rubber bushing 55 serves, in place of the thermoplastic bushing 43, to provide the desired pre-load and also to eliminate the necessity of close tolerances in the dimensioning of the elements making up the joint assembly. A sleeve 56 is positioned between the bushing 55 and the cylindrical portion of the stud 33a. Said sleeve 56 is preferably formed of nylon or other self-lubricating thermoplastic resin, and is provided at its upper end with an out-turned annular flared portion, or flange 57, for abutment against the undersurface 58 of the headed end 53. The lower end 59 of said sleeve 56 extends below the lower end of the bushing 55 and between a ring 45a and the surface of the stud 33a. As before, a rubber doughnut 46 seals the lower end of the joint assembly.

In the modified version of our invention illustrated in FIGURE 3, the sleeve 56, because of its inherently low coefficient of friction, provides minimum resistance to relative rotation of the stud 33a under turning loads and insures that the desired value of the turning torque will remain nearly constant throughout the life of the assembly.

The structure illustrated in FIGURE 4 is generally similar to that of FIGURE 2, except that the stud 33b is provided with a differently shaped head portion 60, and a separate element, indicated by the reference numeral 61, is interposed between said headed portion 60 and the inner closed end 62 of the socket 27. Said headed end 60 is provided with a coaxial, segmental spherical, concave surface 63, and the element 61 is either fully spherical or segmental spherical to provide a mating bearing surface 64. The closed end 62 is provided with a recess 65 of smooth but only partially conforming curvature with respect to the segmental spherical surface 64 of the element 61. Said element 61 is also provided with an equatorial flange 66, which limits rotational movement of said element. The material of which the element 61 is formed is preferably a thermoplastic resin having a low coefficient of friction and good noise damping properties. For this purpose, a polyethylene or polypropylene resin, or an acetal resin, such as the one sold under the trademark "Delrin," a co-polymer of trioxane, such as sold under the trademark "Celcon," or a polytetrafluorethylene resin, such as that sold under the trademark "Teflon," can be used.

As in the previous structures described, the structure of FIGURE 4 is so assembled as to place the thermoplastic material of bushing 43 under a predetermined compressive load. Accordingly, the ball element 61, in addition to providing for relative rotation between the stud 33b and the socket 16, assumes whatever axial load is placed upon the joint. The stud 33b and the ball element 61 may be pre-greased before insertion into the bore 27 of the socket portion 16, and the joint will remain permanently lubricated upon the completion of the assembly.

In the further modified structure shown in FIGURE 5, the stud 33c is provided with a headed end 70 having a conical protuberance 71 extending upwardly and coaxially of said stud. Said protuberance 71 is received in a similarly shaped recess 72 formed in the end wall 73 of the socket 27. The conical mating surfaces so provided between the protuberance 71 and the recess 72 provide for extremely high radially applied load-carrying capacity 90° to axis of stud, without, however, permitting the angular movement of the stud relative to the socket to the extent permitted by the previously described structures of FIGURES 2, 3 and 4.

Figure 6:
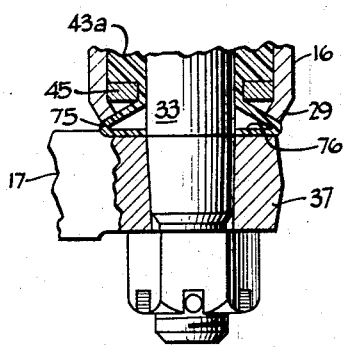
FIGURE 6 is a fragmentary sectional view, partly in elevation, of yet another modification of our invention.

The structure illustrated in FIGURE 6 is similar to that of FIGURE 2, except that the bushing 43a is provided at its lower end with a thin-walled extension 75 that is reversely bent below the ring 45 to provide a radially inwardly directed sealing flange 76. When the boss 37 of the idler arm 17 is assembled on the stud 33, said inturned flange 76 is forced into sealing engagement with the cylindrical portion of said stud and also with the upper surface of said boss 37. The reversely bent portion of the extension 75 is, at the same time, urged against the lower end edge of the inturned flange 29 on the socket 16. The integral extension 75 on the thermoplastic bushing 43a thus takes the place of the rubber doughnut 29 of FIGURE 2 to effect permanent sealing of the joint.

Figure 7:
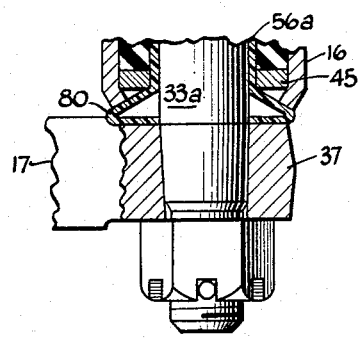
FIGURE 7 is a view similar to FIGURE 6 of yet another modification of our invention.

In the structure illustrated in FIGURE 7, the sleeve 56a is provided with a similarly, reversely bent extension 80 to the extension 75 and functions in a manner exactly similar to that just described for the extension 75.

As will be appreciated, the various features of the several modified forms of our invention here illustrated may be combined with each other to provide different specific combinations from those here illustrated, but nevertheless still functioning in a similar manner to that described and thereby affording the superior advantages and improved results ascribed to our invention.

We claim as our invention:

1. In an automotive steerage linkage,
   an idler bracket and socket assembly of integral construction having a frame-attaching bracket portion at one end and a socket portion at the other end,
   a cylindrical pivot pin assembly,
   said socket portion being adapted to receive said cylindrical pivot pin assembly and being closed at its axially inner end but open at its axially outer end and having a smoothly cylindrical inner wall between said inner and outer ends,
   said wall being provided with an integral, radially-inturned flange retaining said pivot pin assembly within said socket portion against axial movement relative thereto.

2. In a vehicular steering linkage,
   an idler arm bracket and socket assembly comprising a unitary bracket and socket member having a bracket portion at one end and a socket portion at the other end, said socket portion having a cylindrical wall defining a socket coaxial with said wall, open at its outer end and closed at its inner end,
   a pivot assembly mounted in said socket including a pin extending axially of said socket and rotatable relative thereto,
   bearing means at the inner end of said pin providing limited angular and full rotational movement of said pin,
   a bushing having a low flex modulus between said pin and wall surrounding said pin, and
   means including an inturned end of said wall placing said bushing under load.

3. In a vehicular steering linkage as defined by claim 2, a pivot assembly wherein:
   said bearing means is a head on said pin having a segmental spherical portion in conforming surface engagement with said socket inner end.

4. In a vehicular steering linkage, as defined by claim 2, a pivot assembly, wherein:
   said bearing means includes a separate bearing having a low coefficient of friction and good noise-damping properties, and
   said socket inner end, said bearing and said pin inner end have conforming segmental spherical surfaces providing for relative rotational movement between said bearing and said socket and pin inner ends.

5. In a vehicular steering linkage as defined by claim 4, a pivot assembly wherein:
   said separate bearing is formed of an acetal resin.

6. In a vehicular steering linkage, as defined by claim 4, a pivot assembly wherein:
   said bushing is formed of a synthetic thermoplastic resin.

7. In a vehicular steering linkage, as defined by claim 4, a pivot assembly wherein:
   said bearing is formed of an acetal resin, and
   said bushing is formed of a polyethylene resin.

8. In a pivot pin joint assembly,
   a member having formed integrally therewith a cylindrical socket closed at its inner end and open at its outer end,
   a headed pivot pin in said socket with the head thereof cooperating with the closed inner end of said socket to take an axial bearing load and with the outer end of said pin extending out of the open end of said socket,
   a flexible sleeve bearing within said socket surrounding said pin and formed of a thermoplastic of a low coefficient of friction,
   an elastomeric bushing about said sleeve bearing and extending to a point adjacent the open end of said socket, and
   means including an inturned flange at the open end of said socket cooperating with said bushing to exert a load through said bushing radially inwardly against said sleeve bearing to establish a relatively constant torque value for relative turning movement of said pivot pin and socket.

9. A pivot pin assembly as defined by claim 8, wherein:
   said sleeve bearing is formed of nylon,
   said elastomeric bushing is rubber, and
   a seal of elastomeric material is provided at said socket open end surrounding said pin outer end and retained in place by said inturned annular flange.

10. A pivot pin joint assembly as defined by claim 8, wherein:
    a mass of thermoplastic material having a low coefficient of friction is positioned between the closed end of said socket and the headed end of said pivot pin to provide relative surface turning movement therebetween.

11. In a steering linkage assembly, an idler arm assembly, comprising,
    an integral bracket and socket member having a bracket portion at one end and a cylindrical socket portion at the other end axially offset from said bracket portion,
    said socket portion having a cylindrical wall defining a coaxial socket closed at its inner end and open at its outer end,
    a pivot assembly within said socket including a pivot pin having an inner headed end and a link-connecting end externally of said socket,
    a separate load-carrying bearing, of a thermoplastic resin, having a low coefficient of friction and good noise-damping properties positioned between said socket inner end and said headed pivot end,
    a thermoplastic resin bushing having a low flex modulus surrounding said pin within said socket, and
    means including an inturned annular flange on the outer end of said socket wall retaining said pivot assembly in said socket and said bushing under compressive load.

12. In a steering linkage assembly, an idler arm assembly as defined by claim 11, wherein:
    said headed pivot end and said socket inner end have cooperating arcuate surfaces therebetween providing for relative rotational movement.

13. In a steering linkage assembly, an idler arm assembly as defined by claim 12, wherein:
    said pivot end and said socket inner end have mating conical surfaces.

14. In a steering linkage assembly, an idler arm assembly as defined by claim 12, wherein:
    said pivot end and said socket inner end have mating segmental spherical surfaces.

15. In a steering linkage assembly, an idler arm assembly as defined by claim 12, wherein:
    said pivot end and said socket inner end have therebetween a separate body of a thermoplastic resin having a low coefficient of friction and good noise-damping properties.

16. In a steering linkage assembly, an idler arm assembly as defined by claim 11, wherein:

said bushing has at its outer end an extension for forming a seal for said pivot assembly, and an annulus cooperating with said inturned annular flange to urge said bushing extension into sealing engagement against said pivot pin.

17. In a steering linkage assembly, an idler arm assembly as defined by claim 16, wherein:

said extension is an integral annular thin-walled portion of said bushing having a reversely bent end for effecting said sealing engagement, and said annulus surrounds said thin-walled portion inwardly of said reversely bent end and is retained in place by said inturned annular flange.

References Cited by the Examiner

UNITED STATES PATENTS

| 2,660,905 | 12/1953 | Marquis | 287—85 |
| 2,778,664 | 1/1957 | Herbenar | 308—238 |
| 2,827,303 | 3/1958 | Herbenar. | |
| 2,844,382 | 7/1958 | Dick. | |
| 3,112,123 | 11/1963 | True | 308—238 |

DAVID J. WILLIAMOWSKY, *Primary Examiner.*

ROBERT C. RIORDON, *Examiner.*

D. C. CHAMPION, R. F. HESS, *Assistant Examiners.*